INVENTOR
LAURENCE H. CARR
BERTRAM J. MILLEVILLE

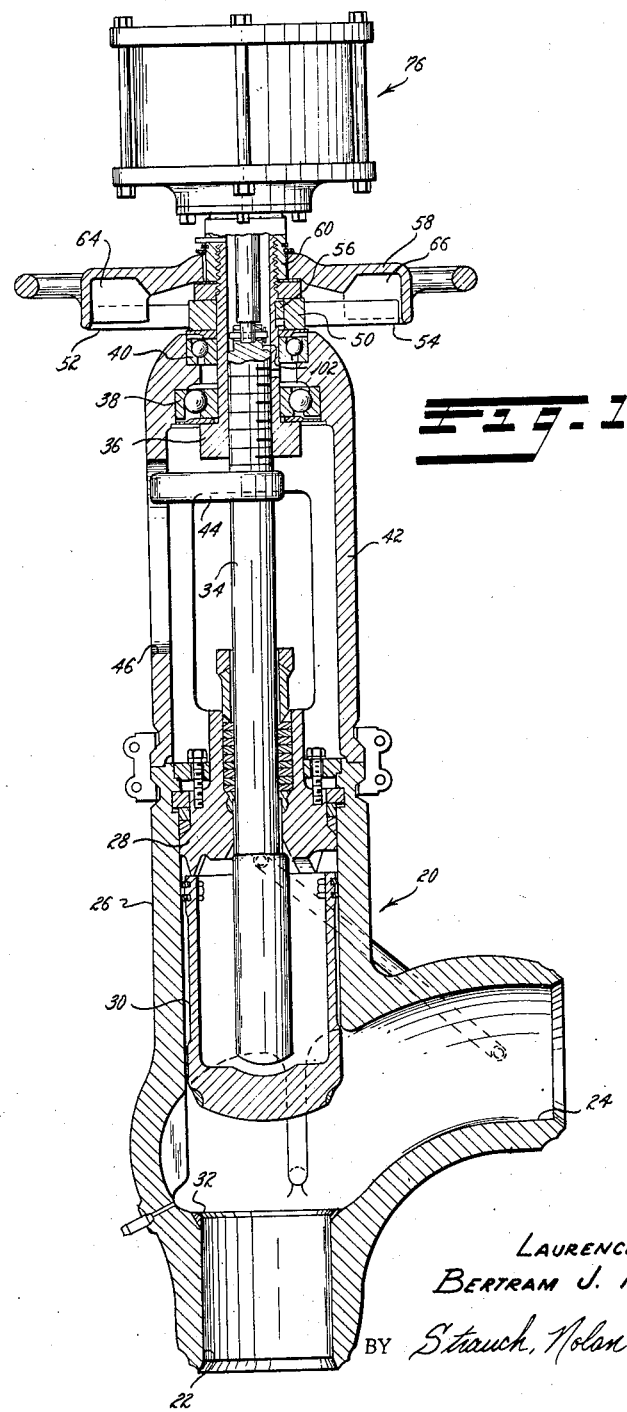

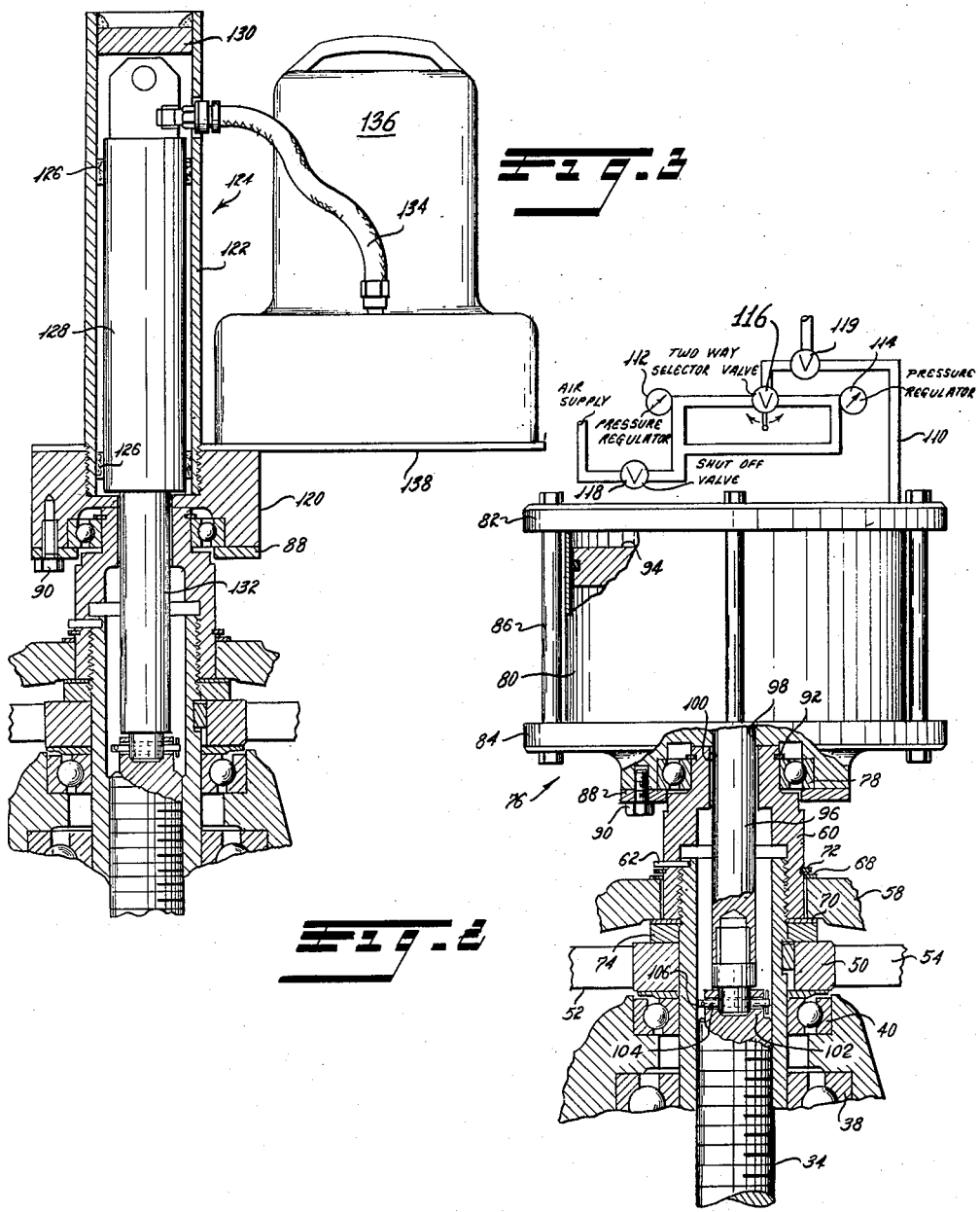

Stauch, Nolan + Diggins
ATTORNEYS

United States Patent Office 2,823,007
Patented Feb. 11, 1958

2,823,007

VALVE CONSTRUCTIONS

Laurence H. Carr and Bertram J. Milleville, Homewood, Ill., assignors, by mesne assignments, to Edward Valves, Inc., East Chicago, Ind., a corporation of Delaware Application October 18, 1954, Serial No. 462,652

11 Claims. (Cl. 251—269)

This invention relates to valve constructions and more particularly to valves adapted for high temperature, high pressure service and to operators therefor.

While the principles of the present invention may be applied to most valves operated by a screw-thread actuated stem, the invention will be disclosed herein as applied to a valve of the type shown in U. S. Patent 2,665,874 adapted for high pressure, high temperature service since this valve typifies units with which the unique advantages of the present invention are best realized.

Such valves are increasingly used to control the flow of fluids at pressures up to 3000 p. s. i. and higher and are often of considerable size. For example, a typical valve may have a closure element twelve inches in diameter, a stem four inches in diameter and the closure may be moved as much as twelve inches between full open and full closed positions. Conventionally such valves are opened or closed by rotation of a threaded stem or a threaded stem support and consequently high torques must be developed to move the valve toward open and closed position.

In valves of the gate and globe type the major forces opposing stem travel are produced by the internal fluid pressure and the friction developed between the stem and the stem packing. The resistance to stem travel is, accordingly, approximately equal to the product of the area of the stem cross section at the stuffing box and the internal pressure in the valve plus friction developed between the packing and the stem during the time the valve is moved from the open to the seated position. Resistance to stem rotation is also produced by high bearing loads despite the low coefficient of friction of bearings employed in such valves.

At the time of seating the resistance to stem travel is considerably increased. In the case of globe valves the resistance may rise to a figure approximately equal to or in excess of the product of the seat area and the line pressure. In the case of gate valves it rises to a figure approximately equal to one-third of the seat area multiplied by the line pressure. The resistance to stem travel during opening movement of the valve is usually less than the resistance developed during closing movements.

Valves of moderate size for handling fluids under moderate pressure are conventionally equipped with a simple handwheel directly connected to the stem or stem operator and in such cases the torque required to move the valve closure may be supplied by one man by rotating the handwheel through many revolutions. The torque for tight seating is in the order of ten times as large (250 ft.-lbs., for example) but since it is exerted ordinarily only through approximately half a turn of the handwheel it can be supplied by increased effort or by extension bars which double or triple the mechanical advantage of the wheel. However, as the sizes and operating pressures are increased, the torque required to move the stem and to effect tight seating exceeds the torque which can be developed by one man or even by several men through a conventional handwheel.

For example, in a twelve inch valve containing a fluid at a pressure of 2000 p. s. i., with a stem having a three inch diameter at the stuffing box, the stem resistance is in the neighborhood of 16,500 pounds of which the stem-packing friction constitutes approximately 2500 pounds. With conventional operating structure a steady pull in the neighborhood of 300 to 500 pounds must be exerted on the rim of a 24 inch diameter hand wheel while it is turned forty-eight revolutions. This is considerably in excess of the force which can be reasonably applied by one man. If gearing is introduced into the system the force can be decreased but the total number of turns is correspondingly increased so that the effort required remains above that which can be conveniently applied. When a valve of this type is seated, the stem load may increase to approximately 200,000 pounds for a globe valve or 80,000 pounds for a gate valve. If a conventional handwheel is used, a rim force of 3000 pounds may be required to tightly seat a globe valve and a pull of roughly 1000 pounds on the handwheel rim would be required to seat a gate valve.

The increasing importance of valves of this type in industry has inspired a number of efforts to provide apparatus for reducing the force required to operate the valves to render them operable with reasonable speed and ease by one or two men. However, prior to the present invention no mechanically practical solution which can be incorporated in valves of this type at low cost has been found.

A partial solution to the general problem was provided by the impactor handwheel disclosed in U. S. Patent 1,731,314 which has been in widespread use for many years. A handwheel of this type is incorporated in the aforesaid U. S. Patent 2,665,874. While the cost of the impactor handwheel is quite moderate and it successfully applies a high torque through a fraction of a revolution and provides tight seating even in large, high pressure valves, it is not an efficient device for applying forces in the order of 300 to 500 pounds for the large number of full revolutions needed to screw a large valve down from the full open to the full closed position.

It has also been proposed to add gearing in the valve stem actuating system and apparatus of this type is widely available. However, the total number of turns of the handwheel required when such gearing is used is very large and the total work performed by the operator is actually greater than with a simple handwheel because of the added friction in the gearing system.

Toggle mechanisms have also been widely employed as a means for reducing the torque required to operate large valves. In general the performance of such devices is roughly comparable to the impactor handwheel. The handwheel torque required initially to screw the valve down from wide open position with a toggle mechanism may substantially exceed the torque necessary when a direct acting handwheel is used. However, the torque required drops significantly as the valve approaches fully closed position. Consequently, the average torque necessary to operate the valve through the use of a toggle mechanism is not greatly different from the direct acting handwheel. Toggle mechanisms cannot be regarded as a satisfactory solution of the problem of reducing valve operating torques.

Another attempted solution to the problem is the application of motors to the operation of the valve. Electric and air operated motors are now widely used for this purpose. While these motors ordinarily are sufficiently powerful to operate satisfactorily, their initial cost is high and may increase the cost of a large high pressure gate or globe valve by as much as 50%.

It has also been proposed to connect a pneumatic or hydraulic piston or diaphragm directly to the valve stem.

However, if the power elements are made of sufficient size and strength to effect tight sealing of high pressure valves their cost becomes relatively high. Further, failure of operating pressure in the direct acting cylinder or diaphragm installation may permit the valve to immediately move to full open position with dangerous and possibly disastrous results. For these reasons apparatus of this type has not been generally used in large high pressure valve installations.

A limited solution to this problem has also been effected by reduction of the diameter of the valve operating stem. While this expedient reduces the torque required to move the valve to closed position and to seat it, it proportionately reduces the strength of the stem, resulting in the possibility that excessive tightening of the valves may produce buckling of the stem.

In view of the foregoing it is the major purpose and object of the present invention to provide improved valves and operating mechanisms which afford a practical, commercially feasible solution to the increasingly important problem in the industry of providing easy positive operation of valves without unduly increasing the size or cost of the valves.

It is also an object of the present invention to provide improved valves and operating mechanisms therefor which preserve the strength and safety of the valves.

It is an additional object of the present invention to provide improved valves and operating mechanisms through which required operating torques are effectively reduced without interference with positive manual control of the valve in all positions.

It is a further object of the present invention to provide improved operating mechanisms for high pressure valves which may be incorporated in existing valves at low cost and with minimum change in the basic construction of the major valve components.

These and other objects are accomplished in accordance with the present invention by the provision of a fluid pressure power apparatus which may be either pneumatic or hydraulic to valves of essentially conventional design, the pressure applying means being arranged to substantially balance the stem load so that end thrust acting on the valve stem is reduced to zero or a suitably small value. With this arrangement the friction developed between the stem and the threaded operator or yoke nut is reduced to the point where the handwheel can be operated easily by one man to move the valve between open and closed positions.

In one form of the invention the fluid pressure apparatus is so arranged with respect to the remainder of the valve that all bearings are unloaded when sufficient pressure is applied to balance the stem thrust. As a result the torque necessary to operate the handwheel is reduced virtually to that necessary to overcome incidental friction of the assembled parts.

Additional details of the construction and further objects and advantages will become apparent as the description proceeds in connection with the accompanying drawings in which:

Figure 1 is a vertical sectional view partly in elevation of a valve constructed in accordance with the present invention;

Figure 2 is an enlarged fragmentary view showing additional details of the valve of Figure 1;

Figure 3 is an enlarged fragmentary section of a modified form of the invention;

Figure 4:
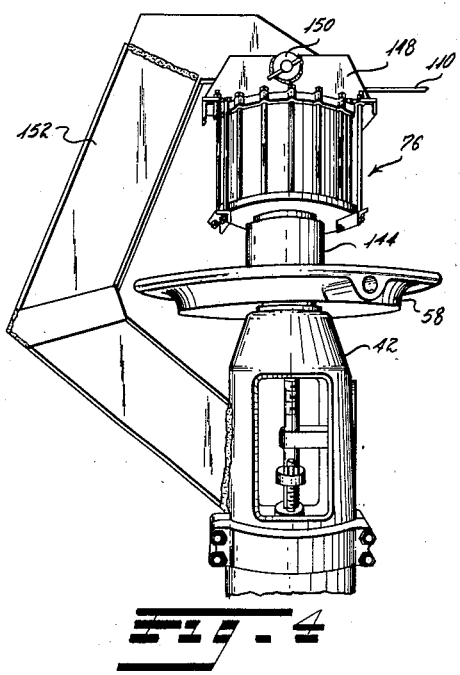
Figure 4 is a fragmentary elevation of a further modification of the invention.

Referring now more particularly to the drawings, the valve shown in Figure 1 is of the angle non-return type. However, it is to be understood that this type of valve is shown by way of illustration only and the invention may be applied with equal effect to other types of stem operated valves including stop valves, gate valves and other forms of globe valves.

The principal elements of the valve structure shown in Figures 1 and 2 are the body 20 having inlet and outlet passages 22 and 24, respectively, and a tubular extension 26 in which a bonnet 28 is received. The valve closure member 30, slidably received in the tubular extension 26, cooperates with a seat 32 to control the passage of fluids through the valve. The closure member may be moved toward the seat by gravity, by the fluid flowing through the valve, or may be positively moved toward closed position by a stem 34 threaded at its upper end into a yoke bushing 36 rotatably mounted by suitable thrust bearings 38 and 40 mounted in the yoke 42. Since rotary movement of the stem 34 is prevented by a guide arm 44 rigidly secured to the stem and having its outer end extending through a slot 46 in the yoke, rotation of the bushing 36 will produce axial movement of the stem.

The basic structure thus far described per se forms no part of the invention, being described, for example, in the aforesaid Patent 2,665,874 to which reference may be made for a more detailed description.

Above the bearing structure a cross arm assembly 50 having opposite radially extending arms 52 and 54 is secured to the yoke bushing 36 by a key 56. A handwheel 58 is rotatably mounted on a bearing adapter 60 threaded onto the upper end of the yoke bushing 36 and held in place after assembly by a pin 62. The handwheel 58 is provided with lugs 64 and 66 adapted to engage the outer ends of the radial arms 52 and 54, respectively. Accordingly when a steady pull is applied to the handwheel the cross arm assembly 50 will be rotated imparting rotation to the yoke bushing 36 to move the stem axially. When additional torque is required to seat the valve the hand wheel may be backed off and rotated rapidly through part of a revolution so that the lugs 64 and 66 strike the ends of the arms 52 and 54 creating by impact a relatively high torque which is effective to move the valve to final seating position. The hand wheel 58 is positioned between upper and lower bearing washers 68 and 70 adapted, respectively, to bear against a retaining ring 72 and a bearing collar 74.

A pneumatic piston and cylinder assembly indicated generally at 76 is supported on the bearing adapter 60 by means of thrust bearings 78. The bearings 78 isolate the assembly 76 from rotational impact imposed on the bearing adapter 60 and the yoke bushing 36 by the impactor handwheel 58. In the form shown, the assembly 76 comprises a cylindrical housing 80 sealingly clamped between upper and lower plates 82 and 84 by a plurality of circumferentially spaced bolts 86. The lower plate 84 is secured to the outer race of the bearings 78 by means of a bearing retainer 88 secured to the plate 84 by a plurality of cap screws 90 (one shown). The bearings 78 are held against upward movement with respect to the bearing adapter 60 by means of a bearing retaining ring 92 received in a groove adjacent the upper end of the bearing adapter.

Received within the housing 80 is a piston 94 carrying a piston rod 96 which projects downwardly through aligned central apertures 98 and 100 formed in the bottom plate 84 and the bearing adapter 60, respectively. While the piston rod 96 may directly contact the upper end of the usual stem it is preferable to provide a pin connection at this point. For this purpose a bifurcated extension 102 is provided at the upper end of the stem, the extension having aligned bores 104 to receive a pin 106 which extends through bore 108 in the lower end of the piston rod 96. Sufficient clearance is provided between the bore 108 and the pin 106 that the load is applied directly to the upper end of the stem by the lower end of the piston rod. The pin 106 is provided to prevent separation of the parts when the stem is screwed down without the application of pressure to piston 94.

The upper end of the cylinder 80 is connected to pressure and exhaust by a duplex system which is effective to apply a predetermined pressure during closing movement and a lower predetermined pressure during opening movement. Different forces are required depending on direction of motion, since during closing, the force to be overcome is the internal pressure load plus the packing friction, whereas during opening, the force to be balanced is the internal pressure load minus the packing friction. To this end the conduit 110 leading to the upper end of the cylinder may be connected to the pressure source alternately through pressure regulators 112 and 114 by means of a two-way selector valve 116. One of the regulators is set to maintain the optimum pressure for closing movement and the other is set to maintain a lower optimum pressure for opening movement. The cylinder 80 may be vented by closing a shut-off valve 118 and opening an exhaust valve 119.

The size of the pressure apparatus 76 is preferably such that the desired downward force on the stem can be obtained with air pressures which are usually readily available, for example, 100 p. s. i. For example, if the area of the stem is seven square inches, the maximum valve pressure 3000 p. s. i., and packing friction 2500 lbs., the area of piston 94 will be approximately 235 square inches so that by application of an air pressure of 100 p. s. i. the downward force exerted by the piston 94 exactly neutralizes the upward thrust exerted by the internal pressure within the valve and the frictional resistance to stem motion developed by the packing.

In operation when it is desired to close the valve from fully open position, fluid under pressure is admitted to the assembly 76 through regulator 112, for example, until the downward pressure applied by the piston rod 96 to the upper end of the stem exceeds the upward thrust exerted on the stem by the internal fluid pressure within the valve by an amount approximately equal to that developed by frictional resistance of the packing to stem motion. Under standard conditions this pressure can be calculated. In any event the proper pressure can easily be determined simply by increasing the pressure applied by adjustment of the regulator 112 until the handwheel rotates with the desired ease. Actual tests have shown that with the proper degree of pressure, the torque required to screw the valve down is reduced to a level which requires only one operator even in valves of the largest size. Final seating pressure may be obtained in the usual manner by use of the impactor handwheel arrangement. The proper pressure to permit minimum torque during opening movement may be determined in a similar manner and regulator 114 may be set accordingly to maintain this pressure.

It is to be noted that the apparatus 76 is used merely to facilitate positioning of the valve stem and not to position the valve stem. Accordingly, failure of the pressure cannot affect the position of the valve regardless of the position it occupies at the time of pressure failure.

Also it is to be noted that the entire apparatus is extremely simple and accordingly relatively inexpensive particularly as compared with prior devices of comparable effectiveness. Also, it can be seen by a comparison of Figure 2 of the present application with Figure 1 of the aforesaid Patent 2,665,874 that the apparatus may be readily applied to valves of existing construction at minimum expense and with very little modification.

As stated above the pressure applied to the upper end of the stem can be developed by hydraulic means as well as the pneumatic assembly and the former may be preferable in installations where a source of air under pressure is not readily available and may also be preferred because of its decreased bulk. Figure 3, to which reference is now made, discloses a modification of the invention incorporating a hydraulic ram. To render the two units interchangeable all of the basic elements including the handwheel, the yoke bushing, the bearing adapter and the bearing assembly of Figure 3 are identical with the corresponding elements previously described in connection with Figure 2. With further reference to Figure 3, an annular support member 120, which is substituted for the plate 84 of the apparatus in Figure 2, is secured to the bearing assembly 78 by means of the plate 88 and the cap screws 90. Threaded into an upwardly opening aperture in the support member 120 is a tubular casing 122 in which a hydraulic ram 124 of conventional construction is supported for limited axial movement on felt rings 126. The ram 124 includes a cylinder assembly 128, the upper end of which is adapted to bear against end plate 130 welded or otherwise secured to the upper end of the casing 122, and a piston 132, the lower end of which bears against the upper end of the stem 34. Fluid under pressure is supplied to the ram through a hose 134 connected to an electrically operated self-contained hydraulic pump 136 of conventional design mounted on a plate 138 secured to the upper surface of the support member 120. Commercially available units of this kind incorporate means for regulating the pressure supplied through the conduit 134 as desired. Accordingly by proper regulation of the hydraulic pressure the endwise thrust load imposed on the stem 34 can be substantially neutralized so that the operation of the apparatus is the same as that of Figure 3 described above.

It will be noted that in each form of the invention discussed above the fluid pressure apparatus, when properly controlled, is effective to eliminate the major source of resistance to stem travel. In each case the resistance to stem travel is reduced substantially to that caused by the friction produced in the bearings 38, 40 and 78. It will be appreciated that in the constructions of Figures 1 through 3, despite the fact that a high downward force is applied to the upper end of the operating stem 34, nevertheless the upwardly directed force exerted on the lower end of the stem by internal fluid is applied undiminished to the bearings 38, 40 and 78. In effect the load on the stem threads is shifted to these thrust bearings. While these bearings may have a coefficient to friction as low as .01 the high load developed by the internal fluid pressure generates a very appreciable resistance to rotation of the handwheel. As stated above the present invention also contemplates an arrangement which effectively eliminates this resistance to stem travel. This modification is shown in Figures 4 and 5 to which more particular reference will now be made.

Figure 5:
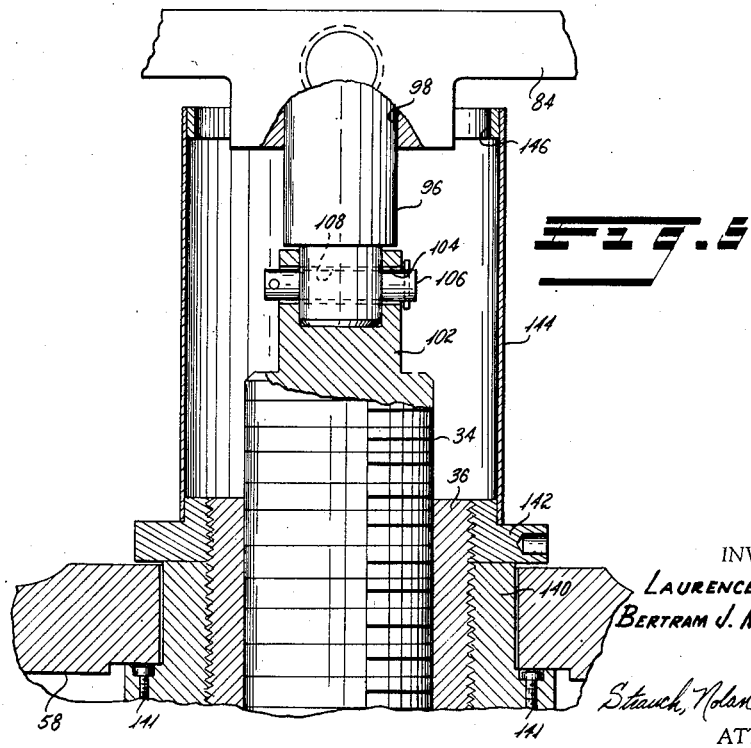
Figure 5 is an enlarged central vertical section of the apparatus of Figure 4.

The valve structure of the unit shown in Figures 4 and 5 is substantially identical with that previously described in connectoin with Figures 1 through 3. However, the bearing adapter 60 of the previous embodiments is replaced in the unit of Figures 4 and 5 by a sleeve 140 threaded onto the upper end of yoke bushing 36 and fitting within the handwheel hub 58. The sleeve is secured to the hub of the cross arm assembly 50 by screws 141. Threaded onto the yoke bushing 36 above the sleeve 140 is a retaining nut 142 which extends outwardly over the upper surface of the handwheel to retain the latter in position.

A protective cylindrical sheet metal collar 144 is secured at its lower end to the retaining nut 142 and extends upwardly to a point opposite the lower surface of the plate 84 forming the lower end of the pressure cylinder and is provided at its upper end with a stiffening ring 146.

The essential difference between the unit of Figures 4 and 5 and the units previously described resides in the means for mounting the pressure assembly 76.

As seen particularly in Figure 4 the assembly 76 is provided on its upper surface with a bifurcated bracket 148 which is connected by a pin 150 to the upper end of a heavy rigid structural support member 152 welded at its lower end to the yoke 42.

Since the pressure assembly 76 is connected directly to the yoke 42 by the bracket 152 the bearings 78 are eliminated and the yoke bushing bearing assemblies 38 and 40 are unloaded during operation of the valve in either direction, the load otherwise imposed on these bearings being transferred directly to the valve body. Accordingly, the apparatus of Figures 4 and 5 is effective to reduce operating torques beyond the low value achieved by the apparatus of Figures 1 through 3 and is thus preferred in installations where the added weight and bulk of the assembly due to the inclusion of the bracket 152 is not objectionable.

From the foregoing it will be apparent that the above stated objects of the invention have been attained by the provision of simple, inexpensive means for reducing valve operating torques which may be installed on original equipment or as a replacement on existing valves easily and inexpensively and which permit positive manual operation of the valve and which may be used without adversely affecting the safety or the pressure rating of the valve.

The invention may be embodied in other specific forms without departing from the spirit or essential characteristics thereof. For example, while the invention has been specifically disclosed in several embodiments as applied to valves having a rotating stem operator and a stem fixed against rotation it will be appreciated that the invention has equal application to valves having a rotating stem. The embodiment of the invention shown in Figures 4 and 5 could be adapted for use with such a valve merely by substituting an anti-friction connection for the pin connection between the adjacent ends of the piston rod 96 and the stem 34. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve having a body through which fluids flows under pressure, a valve stem having a threaded section, a yoke attached to said valve body, cooperating means on said yoke and said stem for preventing relative rotation of said stem with respect to said yoke, a stem operator having internal threads adapted to engage the threaded section of said stem, thrust bearings rotatably mounting said stem operator in axially fixed position in said yoke, means for rotating said stem operator to thereby axially move said stem, a cylinder secured to said valve, a piston within said cylinder, said piston having a rod adapted to engage the free end of said stem, and means for introducing pressure into said cylinder to urge said piston and said piston rod against said free end of said stem to urge said stem inwardly of said valve body and thereby reduce the frictional load on the threads of said stem and said stem operator.

2. In a valve having a body through which fluid flows under pressure, a valve stem having a threaded section, a yoke mounted on said body, a yoke bushing rotatably mounted on said yoke and having internal threads engaging the threads on said stem, a handwheel mounted on said yoke for limited free rotation with respect to said yoke bushing, cooperating means on said yoke bushing and said handwheel effective to transmit rotational movement of said handwheel to said yoke bushing at the end of said limited free rotation of said handwheel whereby the inertia of said handwheel is transferred by impact to said yoke bushing, and means independent of said handwheel for applying an axial force on said stem to substantially balance the axial force on said stem developed by said fluid to reduce the thrust load on the stem threads and facilitate operation of said valve.

3. In a valve having a body through which fluid flows under pressure, a valve stem having a threaded section, a yoke attached to said body, a yoke bushing rotatably mounted in said yoke and having internal threads engaging the threads on said stem, a handwheel mounted on said yoke for limited free rotation with respect to said stem, cooperating means on said yoke bushing and said handwheel effective to transmit rotational movement of said handwheel to said yoke bushing at the end of said limited free rotation of said handwheel whereby the inertia of said handwheel is transferred by impact to said yoke bushing, a fluid pressure cylinder containing a piston, a piston rod on said piston adapted to engage the upper free end of said stem, and means mounting said cylinder in relatively fixed relation with respect to said body whereby upon the application of fluid pressure to the upper surface of said piston said stem is urged axially downwardly against the pressure of said fluid within said valve to reduce the frictional load on the threads of said stem and yoke bushing.

4. The valve according to claim 3 wherein said cylinder is connected to said yoke.

5. The valve according to claim 3 wherein said cylinder is connected to said yoke bushing.

6. In a valve having a body through which fluid flows under pressure, a valve stem having a threaded section, a yoke attached to said valve body, cooperating means on said yoke and said stem for preventing rotation of said stem with respect to said yoke, a stem operator having internal threads adapted to engage the threaded section of said stem, thrust bearings rotatably mounting said stem operator in axially fixed position in said yoke, means for rotating said stem operator to thereby axially move said stem, and additional means connected to said valve body and engageable with said stem to shift the frictional load imposed on the cooperating threads of said stem and said stem operator by the internal fluid pressure to said valve body to thereby facilitate operation of said valve.

7. In a valve having a body through which fluid flows under pressure, a valve stem having a threaded section, a stem operator rotatably mounted in said body and fixed against axial movement with respect thereto whereby rotation of said stem operator axially moves said stem, a cylinder secured to said valve, a piston within said cylinder, said piston having a piston rod adapted to engage the free end of said stem, means for introducing pressure into said cylinder at a first predetermined pressure during closing movement of said valve to urge said piston rod against said free end of said stem and said stem operator, and means to introduce fluid under a second predetermined pressure into said cylinder during opening movement of said valve.

8. A valve according to claim 1 wherein said cylinder is secured to said stem operator whereby the frictional load on the cooperating threads of said stem and said stem operator is transferred to said thrust bearings.

9. In a valve having a body through which fluid flows under pressure, a valve stem having a threaded section, a yoke attached to said valve body, cooperating means on said yoke and said stem for preventing rotation of said stem with respect to said yoke, a stem operator having internal threads adapted to engage the threaded section of said stem, thrust bearings rotatably mounting said stem operator in axially fixed position in said yoke, means for rotating said stem operator to thereby axially move said stem, a cylinder secured to said stem operator, a piston within said cylinder having a piston rod engageable with the free end of said stem, and means for introducing fluid under pressure into said cylinder for urging said piston rod and said stem inwardly of said body to reduce the frictional load on the threads of said stem and said stem operator.

10. In a valve having a body through which fluid flows under pressure, a yoke attached to said body, a valve stem having a threaded section, a stem operator rotatably mounted in said yoke and fixed against axial movement with respect thereto and having threads engageable with said stem thread whereby rotation of said stem operator moves said stem axially, a cylinder secured to said yoke, a piston within said cylinder, said piston having a piston rod adapted to engage the free end of said stem, means for introducing pressure into said cylinder at a first predetermined pressure during closing movement of said valve to urge said piston rod against said free end of said stem, and means to introduce fluid under a second predetermined pressure into said cylinder during opening movement of said valve.

11. In a valve having a body through which fluid flows under pressure, a yoke rigid with said body, a stem for operating said valve threaded through a member mounted in said yoke, a pressure cylinder adapted to be connected to a source of fluid under pressure, a bracket assembly secured to said yoke, means mounting said pressure cylinder on said bracket assembly above the upper end of said stem, a piston within said cylinder having a piston rod engageable with the upper end of said stem, whereby when fluid under pressure is admitted to said cylinder above said piston said piston will urge said stem downwardly against the axial force developed by said fluid in said valve body to thereby reduce the thrust load on said stem threads.

References Cited in the file of this patent

UNITED STATES PATENTS

| 1,899,328 | Hennebohle | Feb. 28, 1933 |

FOREIGN PATENTS

| 610,366 | Great Britain | of 1948 |